(12) United States Patent
Matsumiya et al.

(10) Patent No.: US 7,468,939 B2
(45) Date of Patent: Dec. 23, 2008

(54) OPTICAL DISK APPARATUS WITH PHASE DIFFERENCE OFFSET

(75) Inventors: Hiroaki Matsumiya, Ibaraki (JP); Seiji Nishiwaki, Kobe (JP); Kazuo Momoo, Hirakata (JP)

(73) Assignee: Panasonic Corporation, Kadoma (JP)

( * ) Notice: Subject to any disclaimer, the term of this patent is extended or adjusted under 35 U.S.C. 154(b) by 424 days.

(21) Appl. No.: 10/552,193

(22) PCT Filed: Apr. 6, 2004

(86) PCT No.: PCT/JP2004/004975

§ 371 (c)(1),
(2), (4) Date: Oct. 6, 2005

(87) PCT Pub. No.: WO2004/090879

PCT Pub. Date: Oct. 21, 2004

(65) Prior Publication Data

US 2006/0181996 A1    Aug. 17, 2006

(30) Foreign Application Priority Data

Apr. 9, 2003 (JP) ............................. 2003-105223

(51) Int. Cl.
*G11B 7/085* (2006.01)
(52) U.S. Cl. .................................................. 369/53.23
(58) Field of Classification Search ................... None
See application file for complete search history.

(56) References Cited

U.S. PATENT DOCUMENTS

| | | | |
|---|---|---|---|
| 6,388,963 B1 * | 5/2002 | Tanaka ..................... | 369/44.26 |
| 6,493,296 B1 * | 12/2002 | Fukumoto et al. ......... | 369/44.32 |
| 7,200,076 B2 * | 4/2007 | Katayama ................ | 369/44.32 |
| 2002/0041545 A1 | 4/2002 | Yamasaki et al. | |
| 2002/0060958 A1 * | 5/2002 | Ando et al. ............... | 369/44.23 |
| 2002/0080692 A1 | 6/2002 | Nagaoka et al. | |
| 2002/0126588 A1 | 9/2002 | Katayama | |
| 2003/0048704 A1 * | 3/2003 | Kitamura et al. ......... | 369/44.23 |
| 2003/0048708 A1 * | 3/2003 | Mashimo .................. | 369/44.35 |

FOREIGN PATENT DOCUMENTS

| JP | 2001-307351 | 11/2001 | |
|---|---|---|---|
| KR | 200242200 A | * | 6/2002 |

OTHER PUBLICATIONS

International Search Report for corresponding PCT/JP2004/004975, mailed, May 18, 2004.

* cited by examiner

*Primary Examiner*—Michael V Battaglia
(74) *Attorney, Agent, or Firm*—Renner, Otto, Boisselle & Sklar, LLP

(57) ABSTRACT

An optical pickup device capable of correcting an off-tracking which is ascribable to a phase shift of a differential push-pull signal waveform, even when an optical disk or an objective lens is tilted along a radial direction of the optical disk, so that stable tracking control can be performed; and, an optical disk apparatus comprising such an optical pickup device.

3 Claims, 9 Drawing Sheets

FIG.8
CONVENTIONAL ART
(a)
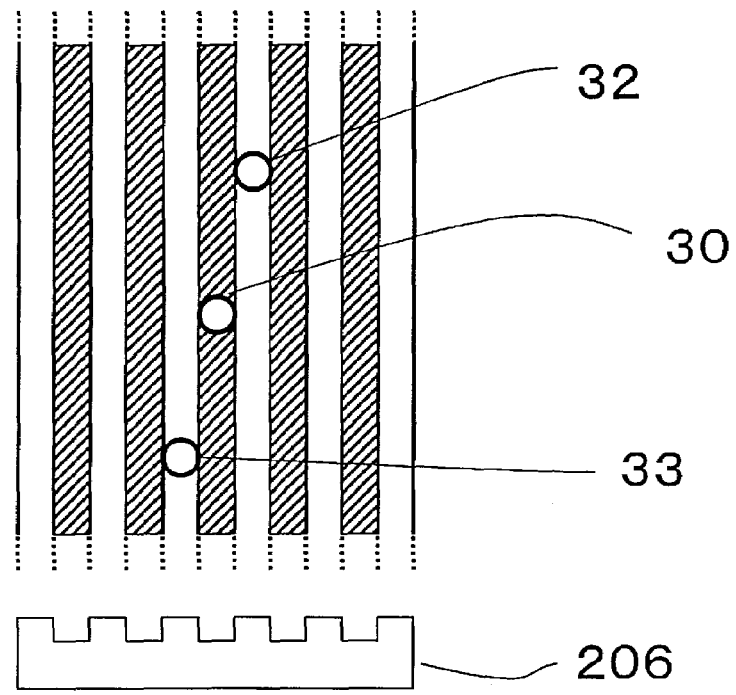
(b)
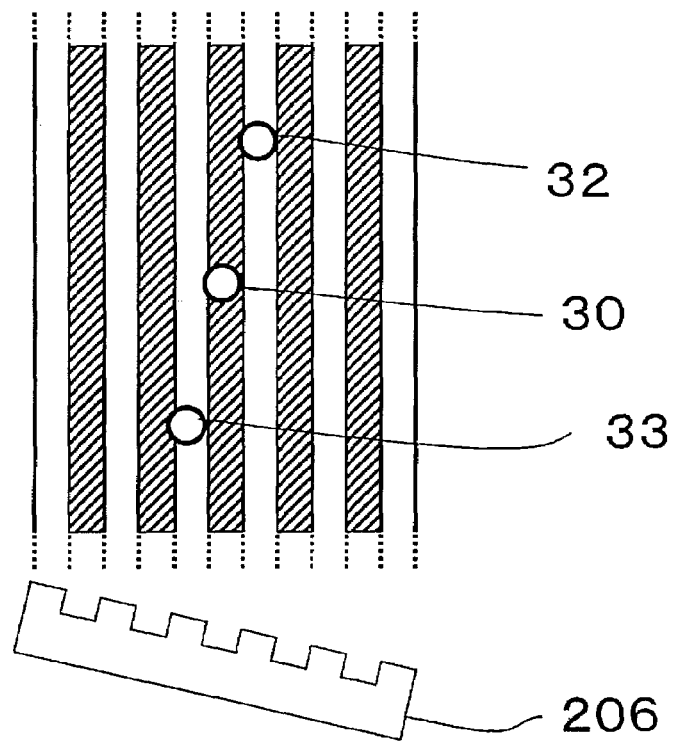

OPTICAL DISK APPARATUS WITH PHASE DIFFERENCE OFFSET

TECHNICAL FIELD

The present invention relates to a pickup device which is capable of, by using a laser light source, optically recording information (data) to an information storage medium such as an optical disk, or reproducing information (data) which is recorded on the information storage medium: and an optical disk apparatus comprising the pickup device.

BACKGROUND ART

In a drive apparatus (optical disk apparatus) which is capable of performing optical recording/reproduction of information for a disk-shaped optical disk, focusing control and tracking control are carried out so as to cause the focal point of a light beam to be placed at a desired position on the recording surface of a rotating optical disk, by using a spindle motor or the like. In an optical disk apparatus which is capable of performing recording/reproduction of information for an optical disk such as a CD-R or a CD-RW, tracking control based on a differential push-pull (Differential Push-Pull: DPP) technique is performed. A DPP technique generates a tracking error signal by applying calculations to output signals from respective photodetectors, which are obtained from a main beam and two sub beams.

Hereinafter, with reference to FIG. 1, a DPP technique which is performed in the aforementioned optical disk apparatus will be specifically described. FIG. 1 shows the structure of an optical system 10 in an optical pickup of an optical disk apparatus. In this optical system 10, a diffraction grating 202 is disposed in a forward path of a light beam which is emitted from a laser light source 201. The diffraction grating 202 diffracts the light beam which is emitted from the laser light source 201 to generate three beams of light, i.e., $0^{th}$ order diffracted light (main beam) and two beams of $1^{st}$ order diffracted light (sub beam). The above three beams of light which have been generated through diffraction by the diffraction grating 202 form three light spots on an optical disk 206 via a beam splitter 203, a collimating lens 204, and an objective lens 205. Light which has been reflected by the optical disk 206 is received by a photodetector 208 via the beam splitter 203 and a detection lens 207.

Now, with reference to FIG. 8, relationship between the positions of spots of the three beams of light formed on the optical disk 206 will be described. FIG. 8(a) is a plan view schematically showing a relationship of spot positions in a state where the optical disk 206 is not tilted with respect to the optical system 10 of FIG. 1. For reference's sake, a partial cross section of the optical disk is shown below the plan view.

As can be seen from FIG. 8(a), a spot of the main beam 30 is formed on a predetermined recording track among a plurality of recording tracks. On both sides of the recording track which is followed by the main beam 30, spots of the sub beams 32 and 33 are formed. More specifically, spots of the sub beams 32 and 33 are positioned near the centers of the guide tracks which are on both sides of the recording track on which the spot of the main beam 30 is positioned. As a result, the positions of the spots of the sub beams 32 and 33 on the optical disk, along the radial direction, are shifted with respect to the position of the spot of the main beam 30 by ±0.5 track pitches.

FIG. 2 shows a detailed structure of the photodetector 208. As shown in FIG. 2, the photodetector 208 includes a main-beam photodetector 301 which is irradiated with the main beam 30 having been reflected from the optical disk 206, and sub-beam photodetectors 302 and 303 which are respectively irradiated with the sub beams 33 and 32 having been reflected from the optical disk 206. Through photoelectric conversion, the photodetector 208 outputs electrical signals which are in accordance with the intensity of the light received by each detection section.

The main-beam photodetector 301 is split in four: detection sections 301a, 301b, 301c, and 301d. The sub-beam photodetector 302 is split in two: detection sections 302e and 302f. The sub-beam photodetector 303 is split in two: detection sections 303g and 303h.

The split detection sections 301a, 301b, 301c, 301d, 302e, 302f, 303g, and 303h output signals A, B, C, D, E, F, G, and H, respectively. By subjecting these signals A to H to calculations, tracking servo error signals are generated. Specifically, based on the signals A to D which are output from the main-beam photodetector 301, an MPP calculation circuit 304 generates a main push-pull signal (MPP). Based on the signals E to H which are output from the respective sub-beam photodetectors 302 and 303, an SPP calculation circuit 305 generates a sub push-pull signal (SPP) and a DPP calculation circuit 306 generates a differential push-pull signal (DPP).

The aforementioned calculations performed by the MPP calculation circuit 304, the SPP calculation circuit 305, and the DPP calculation circuit 306 are executed in accordance with (eq. 1), (eq. 2), and (eq. 3) shown below.

$$MPP=(A+D)-(B+C) \qquad \text{(eq. 1)}$$

$$SPP=SPP1+SPP2=(F-E)+(H-G) \qquad \text{(eq. 2)}$$

$$\begin{aligned} DPP &= MPP - \alpha \times SPP \\ &= (A+D)-(B+C)-\alpha \times \{(F-E)+(H-G)\} \end{aligned} \qquad \text{(eq. 3)}$$

Herein, α is a constant which is determined based on the intensities of the $0^{th}$ order diffracted light, $+1^{st}$ order diffracted light, and $-1^{st}$ order diffracted light. Although eq. 3 includes the coefficient a, the differential push-pull signal (DPP) is, in the broad sense of the word, a differential signal between the main push-pull signal (MPP) and the sub push-pull signal (SPP).

According to the aforementioned tracking servo method, as shown in FIG. 2, the positioning of optical elements such as the diffraction grating 202, the laser light source 201, the photodetector 208 is set so that the respective beams will be positioned on the centers of the split lines of the photodetectors 301, 302, and 303.

FIG. 3 shows signal waveforms 401, 402, and 403 of the main push-pull signal (MPP), the sub push-pull signal (SPP), and the differential push-pull signal (DPP) in the case where the aforementioned ideal positioning is realized.

As is clear from FIG. 3, the phase of the SPP waveform 402 is shifted by π rad (180°) with respect to the phase of the MPP waveform 401, the two waveforms being of inverted relationship. Such a relationship is obtained because, as shown in FIG. 8(a), the spots of the sub beams 32 and 33 are positioned not on recording tracks but on guide tracks, so that their signal polarities are inverted.

Since the polarity of the SPP waveform 402 and the polarity of the MPP waveform 401 are opposite, the phase of the DPP waveform 403 which is obtained in accordance with eq. (3) has the same phase as that of the MPP waveform 401.

In the case where the optical disk 206 is not tilted, as shown in FIG. 8(a), the light spot of the main beam 30 upon the optical disk 206 is on a track center at the position indicated by reference numeral "40" in FIG. 3. The DPP waveform 403 is calibrated and set so as to indicate a zero value at this time.

In the DPP technique, there is performed a tracking control for causing the entire objective lens or the entire optical pickup device to move along a radial direction of the optical disk 206 in such a manner that the DPP waveform 403 exhibits a zero value. Since the light spot that is the target of the tracking control is the light spot of the main beam, the light spot of the main beam will be abbreviated as the "light spot" in the following descriptions, for simplicity.

The above-described conventional optical pickup device is disclosed in, for example, Japanese Laid-Open Patent Publication No. 2001-307351.

In the case where the optical disk 206 or the objective lens 205 is tilted along a radial direction of the optical disk, the MPP, SPP, and DPP signal waveforms change to an MPP waveform 501, an SPP waveform 502, and a DPP waveform 503, respectively, as shown in FIG. 4. This is because, if the optical disk 206 is tilted as shown in FIG. 8(b), the main beam 30 and the sub beams 32 and 33 will be obliquely incident on a recording track/guide tracks on the optical disk 206. As a result, a phase difference occurs between the MPP waveform 501 and the SPP waveform 502. Assume that a phase difference of φ emerges between the MPP waveform 501 and the SPP waveform 502. In this case, the phase of the DPP waveform 503 is shifted from the phase of the ideal signal waveform, which would exhibit a zero value when the light spot is on a track center, and has a phase difference with a magnitude of "φ". Therefore, when a tracking control is performed based on such a DPP waveform 503, the DPP waveform 503 will indicate a zero value at a position indicated by reference numeral "51" in FIG. 4, and therefore the actual light spot will be controlled to a position which is shifted by a distance Δ, which corresponds to the phase difference φ, from the track center (i.e., a position indicated by reference numeral "50"). This distance Δ will be referred to as an "off-tracking amount" of the light spot position. Although the off-tracking amount Δ is described in relation to the DPP waveform 503 in FIG. 4, the actual off-tracking amount is a distance between the light spot position of the main beam and a recording track center on the optical disk.

With the DPP signal (tracking error signal) which has incurred a phase shift as above, it is impossible to control the position of the light spot to be accurately on a track center, so that the tracking control becomes unstable. This results in an off-tracking, i.e., deviation of a light spot on an optical disk from a track center, whereby the recording/reproduction characteristics of the optical disk apparatus are deteriorated.

The present invention has been made in order to solve the above problems, and is aimed at providing: an optical pickup device capable of correcting an off-tracking which is ascribable to a phase shift of a DPP signal waveform, even when an optical disk or an objective lens is tilted along a radial direction of the optical disk, so that stable tracking control can be performed; and, an optical disk apparatus comprising such an optical pickup device.

DISCLOSURE OF INVENTION

An optical disk apparatus according to the present invention comprises: a motor for rotating an optical disk; a light source; diffraction means for diffracting a portion of light emitted from the light source to form a main beam of $0^{th}$ order light and a pair of sub beams composed of $+1^{st}$ order light and $-1^{st}$ order light which are formed on both sides of the $0^{th}$ order light; an objective lens for converging the main beam and the pair of sub beams onto the optical disk; light receiving means for receiving the main beam and the sub beams reflected from the optical disk, and outputting electrical signals through photoelectric conversion; a calculation section for, based on the electrical signals output from the light receiving means, providing a main push-pull signal MPP, a sub push-pull signal SPP, and a differential signal between the main push-pull signal MPP and the sub push-pull signal SPP; and phase difference detection means for detecting a phase difference between the main push-pull signal MPP and the differential signal, wherein, in accordance with an output from the phase difference detection means, an offset is applied in a tracking control of the main beam with respect to the optical disk to compensate for an off-tracking caused by a phase shift of the differential signal.

In a preferred embodiment, the differential signal is a differential push-pull signal DPP.

In a preferred embodiment, the light receiving means comprises: a main-beam photodetector having four split photoelectric conversion sections for receiving the main beam reflected from the optical disk; a first sub-beam photodetector having two split photoelectric conversion sections for receiving one of the pair of sub beams; and a second sub-beam photodetector having two split photoelectric conversion sections for receiving the other of the pair of sub beams, and the calculation section further comprises: first calculation means for determining the main push-pull signal MPP=(A+D)−(B+C), based on signals A, B, C, and D obtained respectively from the four split photoelectric conversion sections of the main-beam photodetector; second calculation means for determining the sub push-pull signal SPP=(F−E)+(H−G), based on signals E and F obtained respectively from the two split photoelectric conversion sections of the first sub-beam photodetector and on signals G and H obtained respectively from the two split photoelectric conversion sections of the second sub-beam photodetector; and third calculation means for determining the differential push-pull signal DPP=MPP−α×SPP (where α is a constant), based on outputs from the first calculation means and the second calculation means.

In a preferred embodiment, signal amplitude calculation means for adjusting amplitudes of the main push-pull signal MPP and/or the sub push-pull signal SPP so that the amplitude of the main push-pull signal MPP and the amplitude of the sub push-pull signal SPP become equal; signal summation means for calculating a sum of the main push-pull signal MPP and the sub push-pull signal SPP which are output from the signal amplitude calculation means; and phase difference calculation means for, based on an output from the signal summation means, calculating a phase difference between the main push-pull signal MPP and the sub push-pull signal SPP are comprised.

An optical pickup device according to the present invention comprises: a light source; diffraction means for diffracting a portion of light emitted from the light source to form a main beam of $0^{th}$ order light and a pair of sub beams composed of $+1^{st}$ order light and $-1^{st}$ order light which are formed on both sides of the $0^{th}$ order light; an objective lens for converging the main beam and the pair of sub beams onto the optical disk; light receiving means for receiving the main beam and the sub beams reflected from the optical disk, and outputting electrical signals through photoelectric conversion; a calculation section for, based on the electrical signals output from the light receiving means, providing a main push-pull signal MPP, a sub push-pull signal SPP, and a differential signal between the main push-pull signal MPP and the sub push-pull signal SPP; and phase difference detection means for detecting a phase difference between the main push-pull signal MPP and the sub push-pull signal SPP, wherein, in accordance with an output from the phase difference detection means, an offset is applied in a tracking control of the main beam with respect to the optical disk to compensate for an off-tracking caused by a phase shift of the differential signal.

A driving method for an optical disk according to the present invention comprises: a step of converging a main beam and a pair of sub beams onto an optical disk and outputting electrical signals based on the main beam and the sub beams reflected from the optical disk; a step of, based on the electrical signals, providing a main push-pull signal MPP, a sub push-pull signal SPP, and a differential signal between the main push-pull signal MPP and the sub push-pull signal SPP; and a step of detecting a phase difference between the main push-pull signal MPP and the differential signal, wherein, based on the phase difference, an offset is applied in a tracking control of the main beam with respect to the optical disk to compensate for an off-tracking caused by a phase shift of the differential signal.

In a preferred embodiment, the differential signal is a differential push-pull signal DPP.

In a preferred embodiment, the step of providing the differential signal comprises: a step of determining the main push-pull signal MPP=(A+D)−(B+C), based on signals A, B, C, and D obtained respectively from four split photoelectric conversion sections of a main-beam photodetector; a step of determining the sub push-pull signal SPP=(F−E)+(H−G), based on signals E and F obtained respectively from two split photoelectric conversion sections of a first sub-beam photodetector and on signals G and H obtained respectively from two split photoelectric conversion sections of a second sub-beam photodetector; and a step of determining the differential push-pull signal DPP=MPP−α×SPP (where α is a constant).

BRIEF DESCRIPTION OF DRAWINGS

FIGS. 8(a) and (b) are diagrams schematically showing a positioning relationship between light spots of three beams 30, 32, and 33 on an optical disk.

BEST MODE FOR CARRYING OUT THE INVENTION

Hereinafter, embodiments of the present invention will be described with reference to the figures.

EMBODIMENT 1

Figure 9:
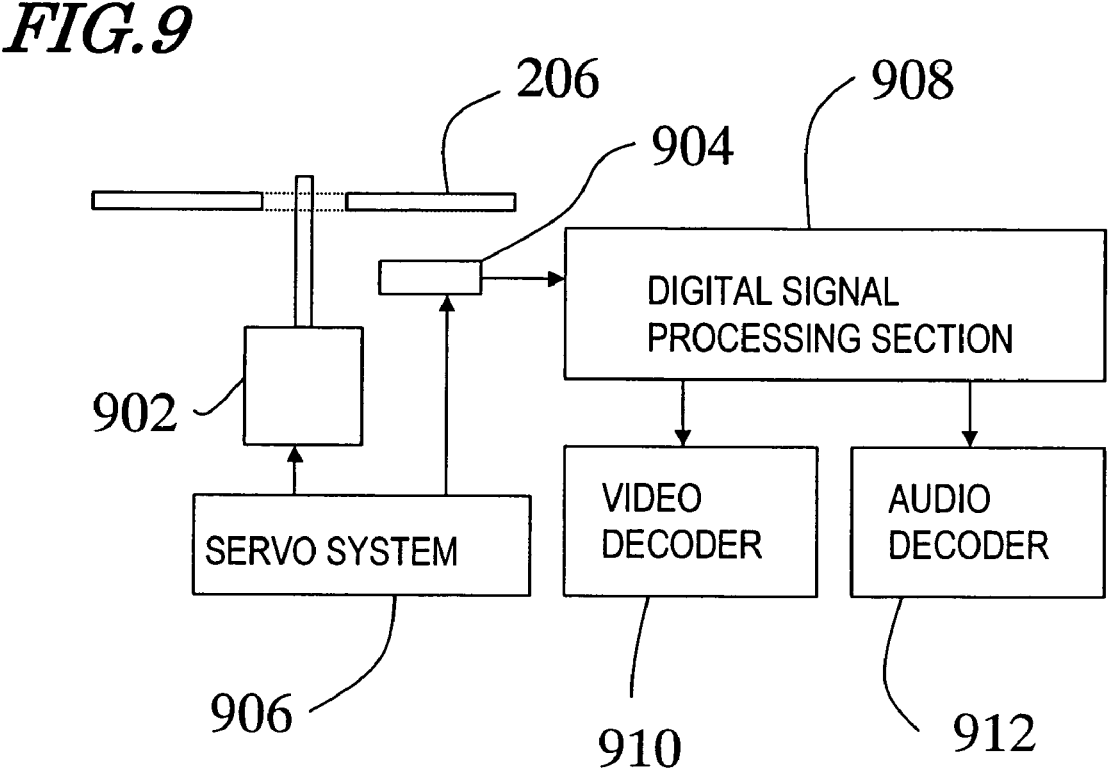
FIG. 9 is a diagram showing the general structure of an optical disk apparatus according to the present invention.

First, FIG. 9 is referred to. FIG. 9 is a diagram showing the general structure of an optical disk apparatus according to the present embodiment.

The illustrated optical disk apparatus comprises: a spindle motor 902 for rotating an optical disk 206; an optical pickup device 904 which optically accesses a desired track on the optical disk 206; and a servo system 906 for controlling the number of revolutions of the spindle motor 902 and the position of the pickup device 904. Moreover, this optical disk apparatus comprises a signal processing section 908 for processing signals which are output from the optical pickup device 904, as well as a video decoder 910 and an audio decoder 912 for decoding a video signal and an audio signal, respectively, which are output from the signal processing section 908. The specific structures of the signal processing section 908, the video decoder 910, and the audio decoder 912 are identical to their known structures.

Although FIG. 9 illustrate constituent elements which are necessary for a reproduction operation of reading data which is recorded on the optical disk 206, constituent elements (not shown) for recording data onto the optical disk 206 may be comprised.

Figure 5:
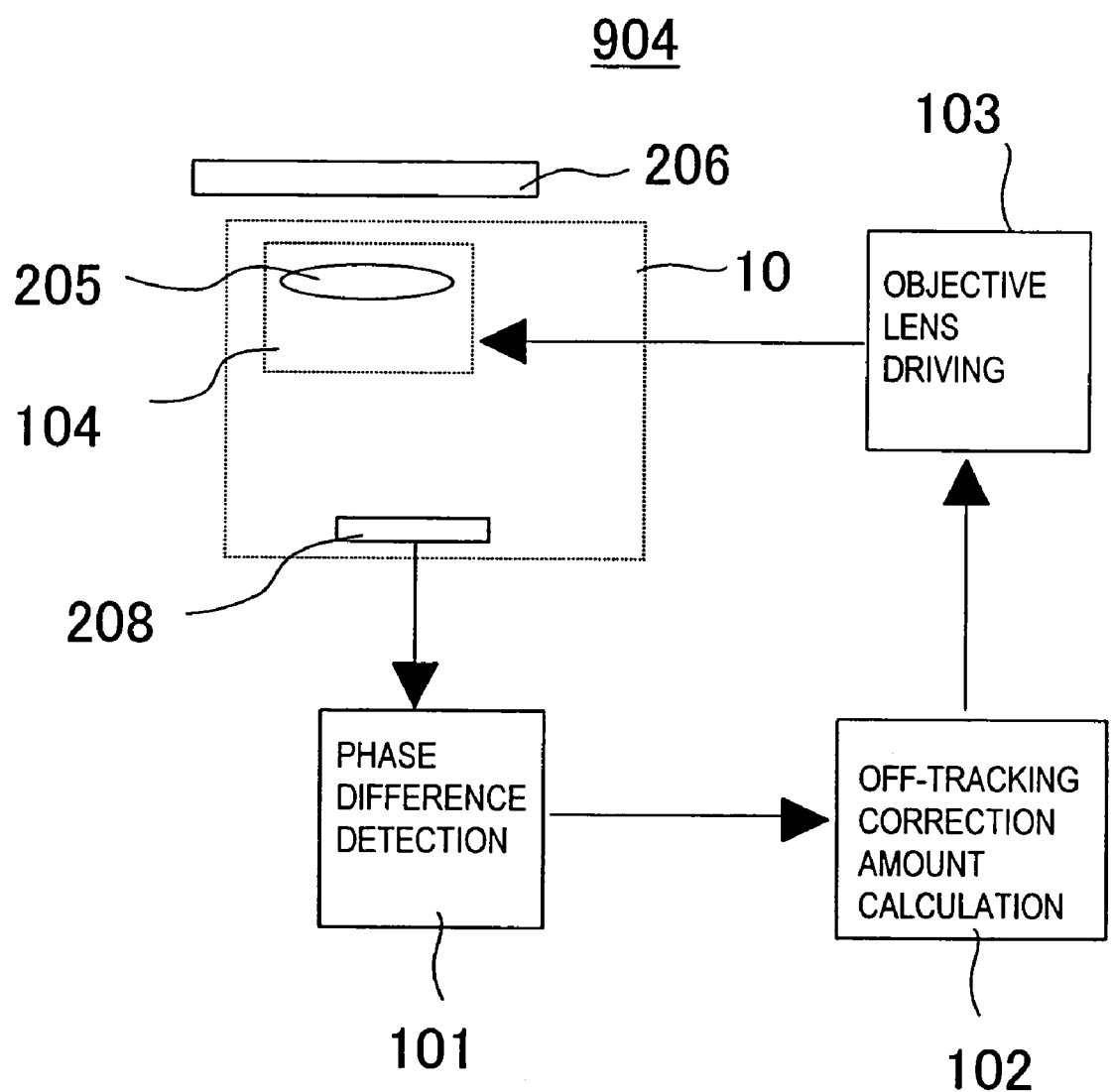
FIG. 5 is a diagram showing the structure of an optical pickup device (first embodiment) of an optical disk apparatus according to the present invention.

Next, FIG. 5 is referred to. FIG. 5 shows the structure of the optical pickup device 904 in the present embodiment.

Figure 1:
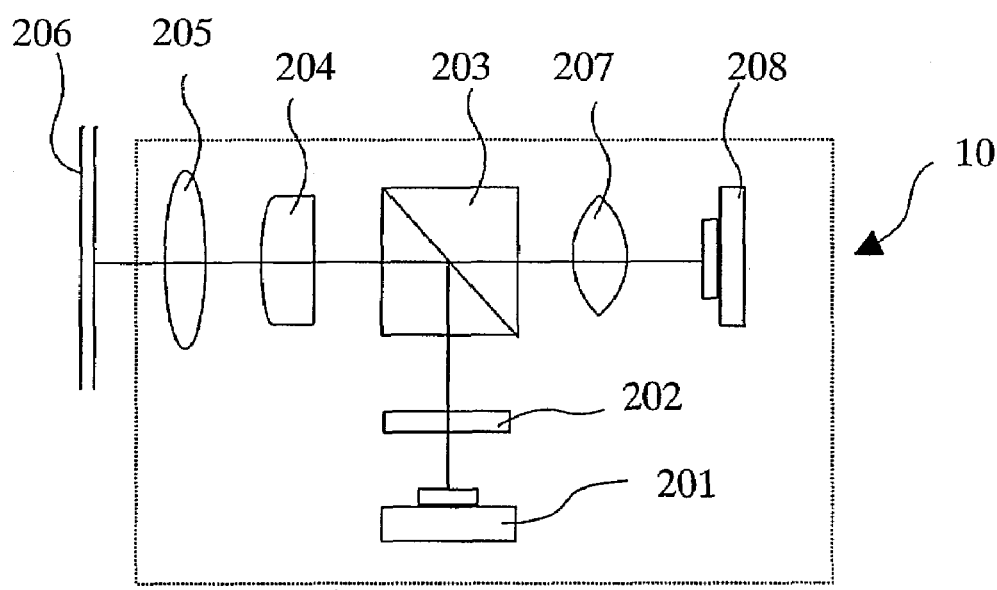
FIG. 1 is a diagram showing the structure of an optical system used in an optical pickup device.

The optical pickup device 904 shown in FIG. 5 comprises an optical system 10, a phase difference detection circuit 101, an off-tracking correction amount calculation circuit 102, and an objective lens driving circuit 103. The optical system 10 of the present embodiment is similar to the conventional optical system shown in FIG. 1, although an objective lens driving device 104 not shown in FIG. 1 is shown in FIG. 5. The objective lens driving device 104 drives the objective lens 205 along a radial direction of the optical disk 206. The structure and operation of the optical system 10 are similar to those of the optical system 10 shown in FIG. 1, and the structure of the photodetector 208 is also similar to the structure shown in FIG. 2, and therefore the detailed descriptions of their structures and operations will not be repeated here.

In the present embodiment, in order to eliminate the aforementioned off-tracking, the optical pickup device 904 comprises the phase difference detection circuit 101 and the off-tracking correction amount calculation circuit 102, and the objective lens driving circuit 103 controls the driving of the objective lens 205 in an appropriate manner.

Hereinafter, with reference to FIG. 5, the phase difference detection circuit 101, the off-tracking correction amount calculation circuit 102, and the objective lens driving circuit 103 will be described.

The phase difference detection circuit 101 of the present embodiment functions as a phase difference detection means for detecting a difference in phase between the waveform of an MPP signal and the waveform of an SPP signal obtained from the photodetector 208 in the optical system 10 of the optical pickup device 904. The phase difference detection circuit 101 simultaneously monitors the MPP signal waveform and the SPP signal waveform, and compares them to detect a phase difference therebetween. The phase difference detection circuit 101 as such can be realized by providing, for example, a circuit which monitors the time at which the output of each of the MPP signal and the SPP signal becomes zero and detects a difference between such times, and a circuit which monitors the frequencies of the MPP signal waveform and the SPP signal waveform and calculates the amount of phase difference corresponding to this time difference. Such a circuit can be realized by hardware, software, or a combination of hardware and software. For example, since a servo processor (IC chip) incorporated in a DVD player or recorder has a function of measuring the phases of signal waveforms, the phase difference detection circuit 101 can be realized by utilizing at least a portion of this servo processor.

The phase difference detection circuit 101 outputs a signal representing the detected phase difference, and sends the signal to the off-tracking correction amount calculation circuit 102.

On the basis of the "phase difference" detected by the phase difference detection circuit 101, the off-tracking correction amount calculation circuit 102 calculates the amount of any off-tracking that occurs, and outputs a signal which represents a off-tracking amount for correction. This signal is sent to the objective lens driving circuit 103. The aforementioned "phase difference" is a phase difference between the aforementioned MPP signal and SPP signal, and occurs when the optical disk or the objective lens is tilted along a radial direction of the optical disk, for example. A method for calculating an off-tracking amount based on a detected "phase difference" will be described later.

Based on the signal which is output from the off-tracking correction amount calculation circuit 102, the objective lens driving circuit 103 is able to drive the objective lens driving device 104 so as to move the objective lens 205 along a radial direction of the optical disk.

Figure 4:
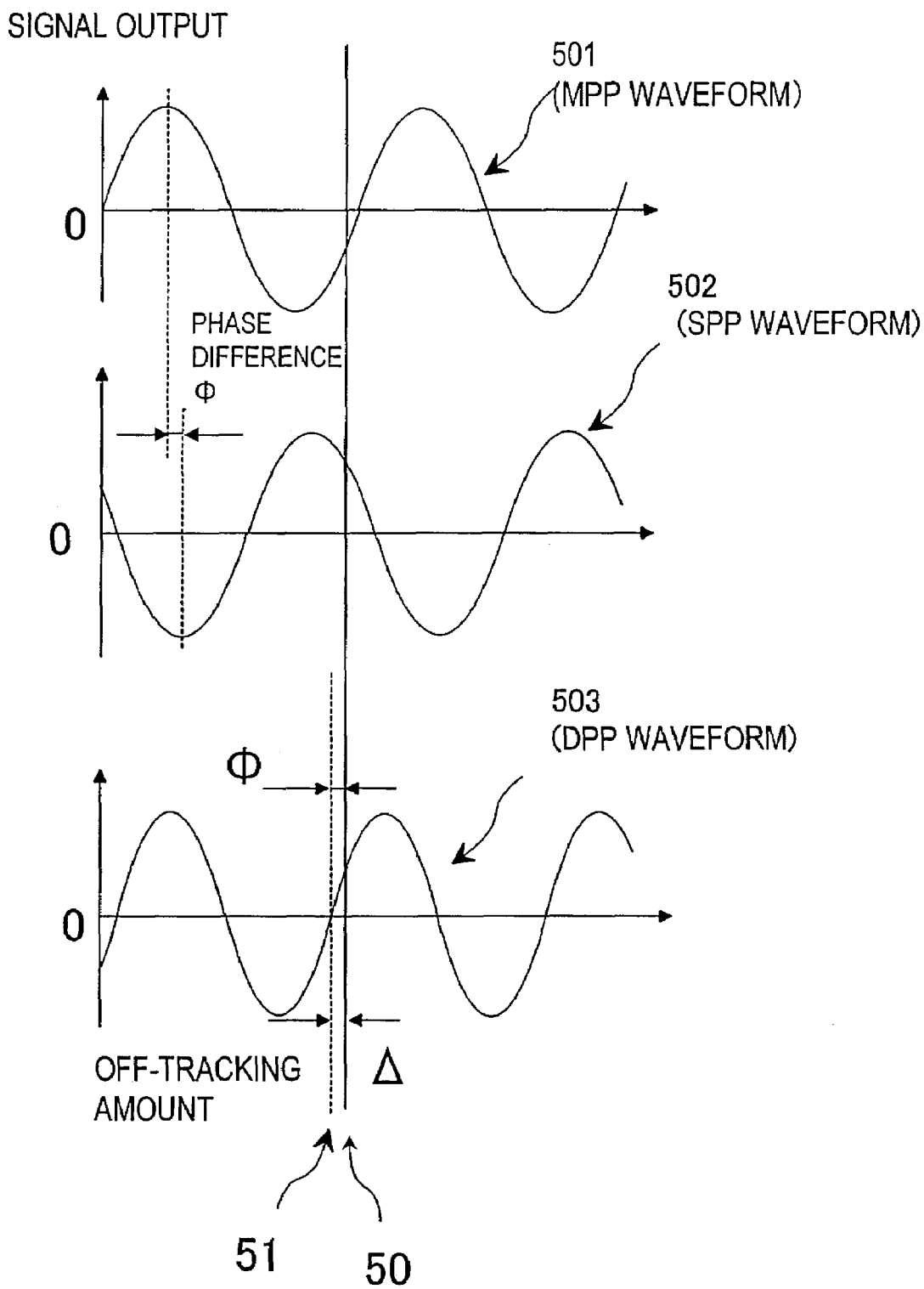
FIG. 4 is a diagram showing an MPP waveform and an SPP waveform having a phase difference, and a DPP waveform.

Thus, in the present embodiment, in accordance with a signal representing a phase difference which is output from the phase difference detection circuit 101, an offset is applied in the tracking control of the objective lens 205, whereby any off-tracking caused by a phase shift of the DPP signal as shown in FIG. 4 is compensated for.

Hereinafter, the correction operation for tracking control will be described more specifically.

The off-tracking amount correction calculation circuit 102 shown in FIG. 5 receives from the phase difference detection circuit 101 a signal representing a phase difference (=phase shift amount of the DPP signal) $\phi$ detected between the MPP signal waveform 501 and the SPP signal waveform 502 as shown in FIG. 4, and then calculates an off-tracking amount $\Delta$ according to the following equation.

$$\Delta = T \times \phi / 2\pi \quad \text{(eq. 4)}$$

Herein, T is a track pitch of the optical disk.

The off-tracking amount correction calculation circuit 102 outputs a signal representing the off-tracking amount $\Delta$ which has been calculated based on (eq. 4), and sends the signal to the objective lens driving circuit 103 in FIG. 5.

The objective lens driving circuit 103 drives the objective lens driving device 104 to move the objective lens 205 along a radial direction of the optical disk. At this time, the determination as to whether the direction of the movement should be toward the outer periphery or the inner periphery of the optical disk is to be made so that the off-tracking will be cancelled. Specifically, a direction of movement for reducing an off-tracking amount is previously determined in accordance with whether the MPP signal being output during tracking control is positive or negative in the DC level. The direction of movement is to be determined in accordance with whether the MPP signal is positive or negative in the DC level.

Next, with reference to FIG. 6, the magnitude of off-tracking amount will be described.

Figure 6:
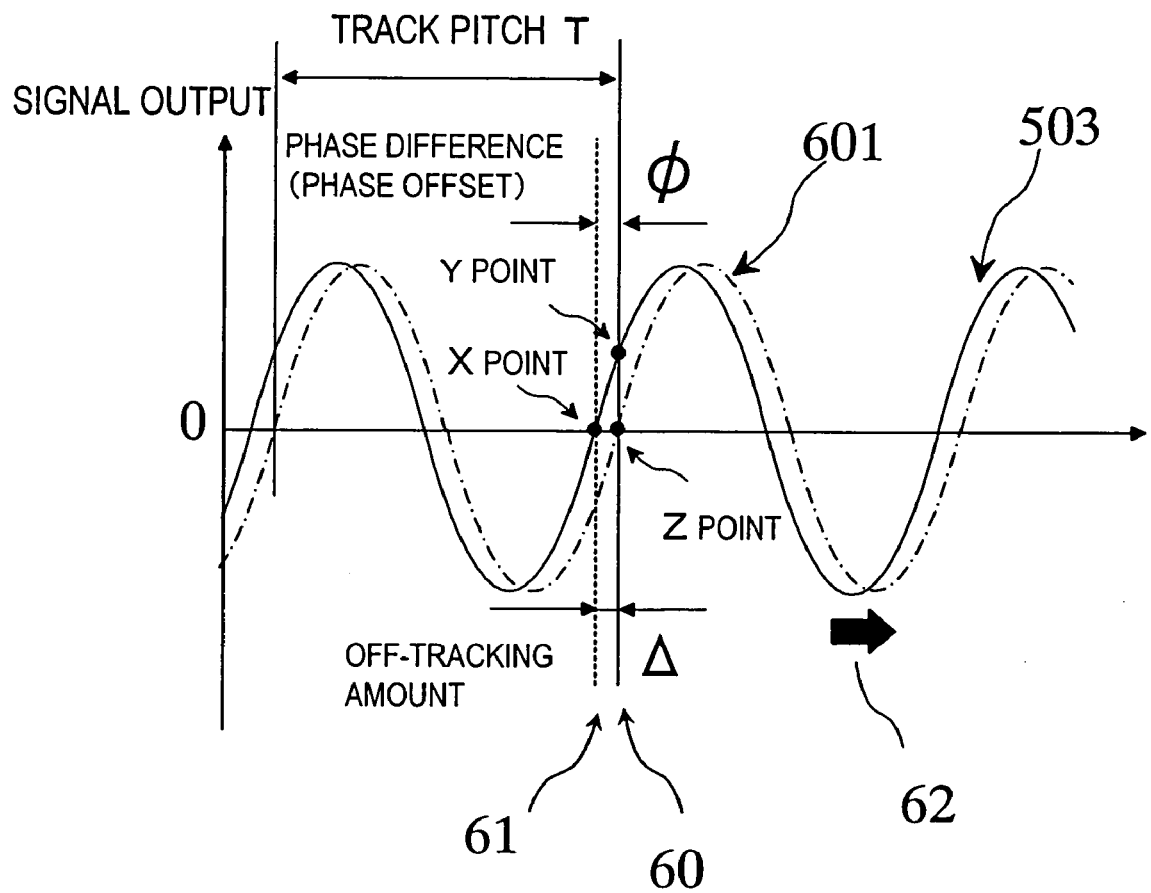
FIG. 6 is a diagram showing a DPP waveform having a phase shift, and a DPP waveform which has been subjected to an off-tracking correction.

FIG. 6 shows a DPP signal waveform 601 in an ideal state where the optical disk or the objective lens is not tilted along a radial direction of the optical disk, and the DPP signal waveform 503 in a state where the optical disk or the objective lens is tilted along a radial direction of the optical disk.

In the case where a phase difference $\phi$ has occurred due to a tilt of the optical disk or the like as in the DPP signal waveform 503, if the conventional tracking control is performed as it is, the position of the light beam spot will be controlled to a position corresponding to a point X, at which the DPP signal waveform 503 has a zero-cross. As a result, the light spot is controlled to a position 61 which is shifted (off-tracked) from a track center. However, in the present embodiment, the off-tracking amount $\Delta$ is corrected so that a tracking control is performed so as to retain the light beam spot at a position 60 corresponding to a point Y of the DPP signal waveform 503.

The reason why the off-tracking amount $\Delta$ corresponding to the phase difference $\phi$ is expressed as in eq. 4 is that $\Delta/T = \phi/2\pi$ holds true when a track pitch corresponding to the radial direction period of the DPP signal waveform 503, 601 is T, as shown in FIG. 6.

Assume that the phase difference detected by the phase difference detection circuit 101 has a magnitude which is represented as $\phi = \pi/4$ (radian), for example. At this time, if the optical disk to be subjected to recording or reproduction is a DVD-R, the track pitch is T=0.74($\mu$m), so that the off-tracking amount $\Delta$ calculated from (eq. 4) is $(0.74 \times \pi/4)/2\pi = 0.0925(\mu m)$.

In this case, the phase difference detection circuit 101 determines the direction of corrected off-tracking based on whether the aforementioned phase difference is positive or negative, and outputs to the objective lens driving circuit 103 a signal representing the aforementioned corrected off-track amount and correction direction. Based on this signal, the objective lens driving circuit 103 drives the objective lens driving device 104 to move the objective lens 205 in the proper direction, along a radial direction of the optical disk, by the corrected off-tracking amount. In this manner, according to the present embodiment, even if a phase difference occurs between the MPP signal and the SPP signal because the optical disk 206 or the objective lens 205 has tilted along a radial direction of the optical disk, for example, the phase shift of the DPP signal which may occur responsive to this phase difference can be compensated for. As a result, a stable tracking control is enabled, and the recording/reproduction performance of the optical pickup device 904 can be improved.

Instead of adopting the above-described structure according to the present embodiment, a DPP phase calculation means which corrects a phase shift in the DPP signal in accordance with the output from the phase difference detection circuit 101 may be used. In this case, the DPP phase calculation means applies an offset of phase $\phi$, in the direction of an arrow 62, to the DPP signal waveform 503 shown in FIG. 6. As a result, an ideal DPP signal waveform 601 which is free of phase shift can be output. In this case, since a usual tracking control centered which is around a point Z (at which the DPP signal waveform 601 has a zero-cross) is performed, the recording/reproduction performance of the optical pickup device can be improved with a simple circuit structure. Note that the offset for such compensation is to be varied in accordance with the measured phase shift $\phi$, rather than being a constant value.

Moreover, the light receiving means in the present embodiment is composed of a four-split photodetector as the main-beam photodetector and two-split photodetectors as the sub-beam photodetectors. However, the light receiving means according to the present invention is not limited to such photodetectors. For example, the number of splits in each sub-beam photodetector may be increased from two to four. In that case, it would be possible to generate a focus error signal by using the signals which are output from the two sub-beam photodetectors.

Moreover, the present invention can be broadly applied to an optical disk apparatus which utilizes a differential push-pull (DPP) technique as a tracking method. The specific structure of the photodetector, e.g., the number of splits and the manner of splitting, is not limited to that in the present embodiment. Furthermore, applications to an optical disk apparatus utilizing a three-beam technique would also be possible.

In the present embodiment, the objective lens 205 (FIG. 5) is driven for performing tracking control. Instead, the optical pickup device itself may be moved along a radial direction of the optical disk 206, by using a mechanism for driving the optical pickup device 904. Also, the structure of the optical system 10 of the optical pickup is not limited to that which is shown in FIG. 1. Based on the outputs from the photodetector 208, calculations similar to the calculations performed by the MPP calculation circuit 304, the SPP calculation circuit 305, and the DPP calculation circuit 306 shown in FIG. 2 may be performed externally to the photodetector 208 to generate an MPP signal, an SPP signal, and a DPP signal.

EMBODIMENT 2

Figure 7:
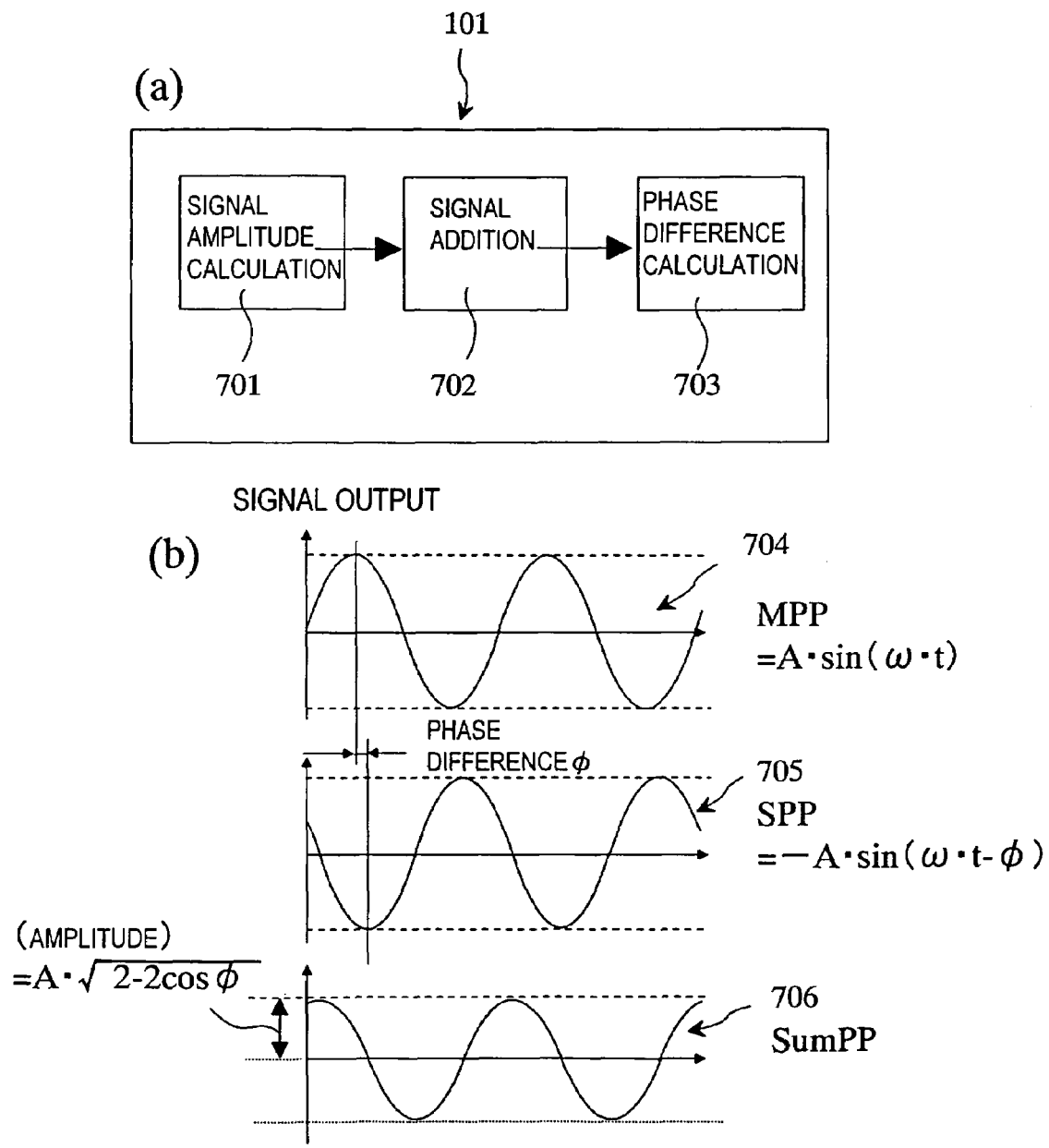
FIG. 7(a) is a diagram showing the structure of a phase difference detection circuit in an optical pickup device (second embodiment) of an optical disk apparatus according to the present invention.
FIG. 7(b) is a diagram showing the waveforms of signals which are generated through calculations in the second embodiment.

Next, with reference to FIGS. 7(*a*) and (*b*), a second embodiment of the optical disk apparatus according to the present invention will be described. FIG. 7(*a*) shows an exemplary internal structure of the phase difference detection circuit 101. Other than the phase difference detection circuit 101, the structure of the optical pickup device of the present embodiment is identical to the structure of the optical pickup device 904 of Embodiment 1.

The phase difference detection circuit 101 of the present embodiment comprises a signal amplitude calculation circuit 701, a signal summation circuit 702, and a phase difference calculation circuit 703.

The signal amplitude calculation circuit 701 performs calculations (conversion) for an MPP signal and/or an SPP signal so that the amplitudes of the MPP signal waveform and the SPP signal waveform become electrically equal to each other, and outputs the MPP signal and the SPP signal whose amplitudes have become equal.

The signal summation circuit 702 receives the MPP signal and the SPP signal which are output from the signal amplitude calculation circuit 701, calculates a sum of both signals, and outputs the sum as a sum signal SumPP. The phase difference calculation circuit 703 receives the sum signal SumPP which is output from the signal summation circuit 702, and based on the amplitude of the sum signal SumPP, determines the phase difference between the MPP signal and the SPP signal according to a specific calculation formula.

Referring to FIG. 7(*b*), a specific procedure of phase difference detection will be described. FIG. 7(*b*) shows waveforms 704, 705, and 706 of the MPP signal, the SPP signal, and the sum signal SumPP, respectively, generated by the above calculation circuits.

Figure 2:
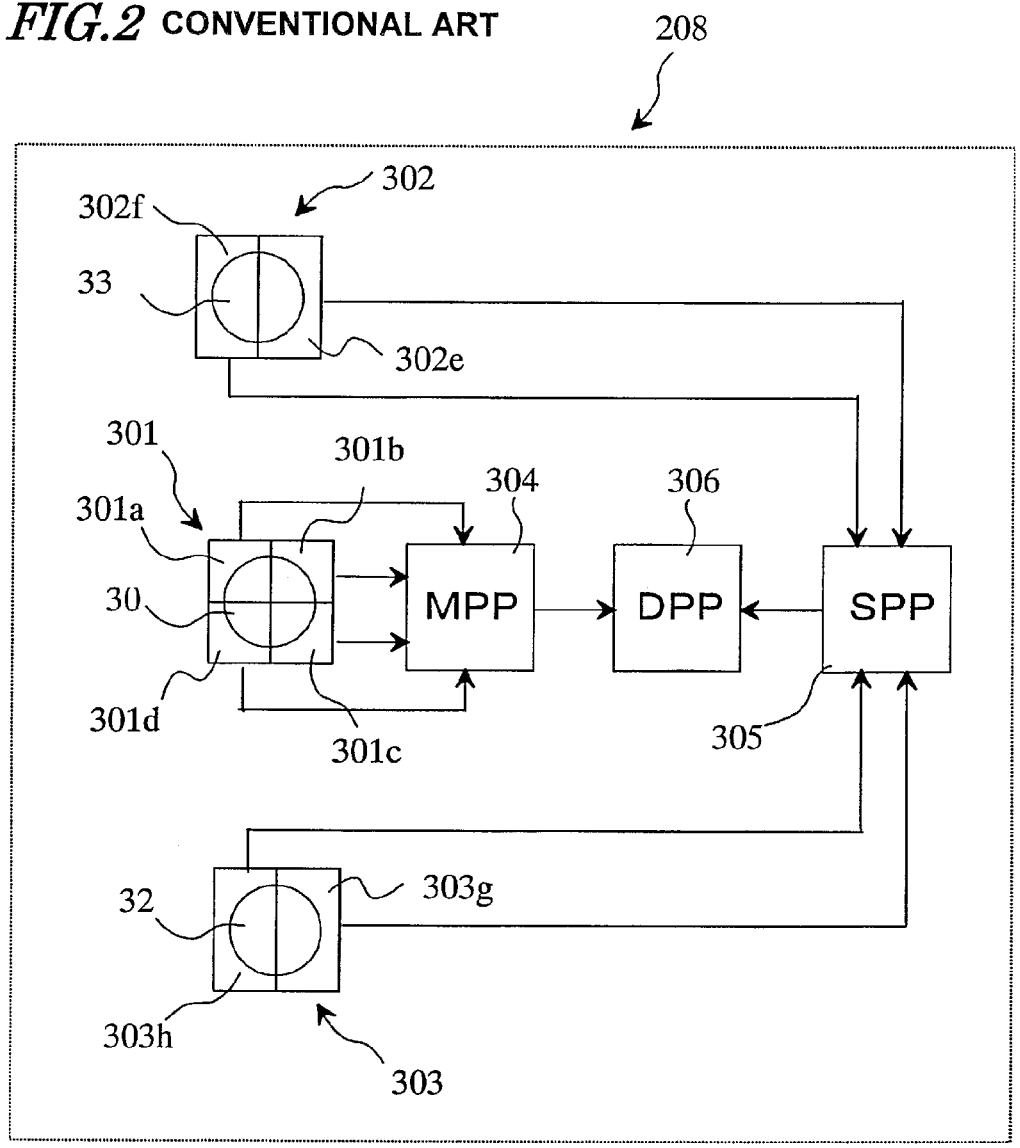
FIG. 2 is a diagram showing the structure of a photodetector used in an optical pickup device.
Figure 3:
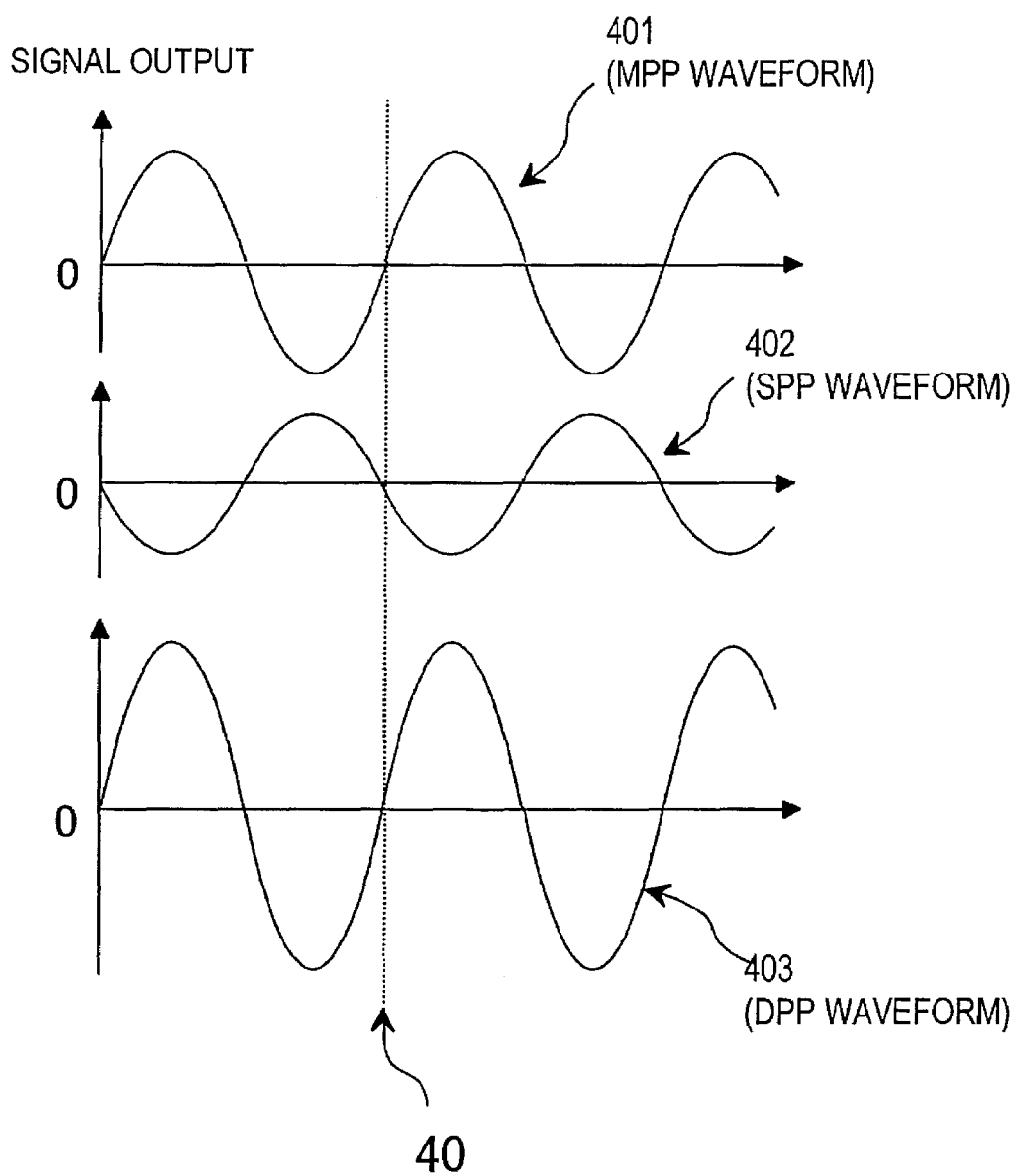
FIG. 3 is a diagram showing signal waveforms obtained by a DPP technique.

The MPP signal and SPP signal which are output from the DPP calculation circuit 306 shown in FIG. 2 are first input to the signal amplitude calculation circuit 701. Then, the signal amplitude calculation circuit 701 outputs an MPP signal and an SPP signal which have been converted so as to have electrically equal amplitudes. Herein, by using the phase difference $\phi$ occurring between the MPP signal and the SPP signal, time t(s), and angular velocity $\omega$ (1/s) of the signal, the MPP signal and the SPP signal can be expressed by the following equations.

$$MPP = A \cdot \sin(\omega \cdot t) \quad \text{(eq. 5)}$$

$$SPP = -A \cdot \sin(\omega \cdot t - \phi) \quad \text{(eq. 6)}$$

Herein, A is a constant representing amplitude.

The MPP signal and SPP signal after conversion are input to the signal summation circuit 702, and the signal summation circuit 702 calculates a sum signal SumPP obtained by adding the MPP signal and the SPP signal, and outputs the result of the calculation to the phase difference calculation circuit 703.

The sum signal SumPP is expressed by (eq. 7) below, based on (eq. 5) and (eq. 6).

$$SumPP = MPP + SPP = A \cdot \sin(\omega \cdot t) - A \cdot \sin(\omega \cdot t - \phi) = A \cdot (2 - 2\cos\phi)$$

Herein, $\delta$ is a constant representing phase.

From (eq. 7), the amplitude of the signal waveform of the sum signal SumPP which is input to the signal summation circuit 703 is a function of $\phi$ as expressed by $A \cdot (2 - 2\cos\phi)^{1/2}$.

Therefore, by detecting the amplitude of the signal waveform of the sum signal SumPP which is input to the phase difference calculation circuit 703, and subjecting it to calculations, the phase difference $\phi$ can be obtained. In other words, in the phase difference calculation circuit 703, an amplitude B of the signal waveform of the SumPP which is monitored can be expressed by (eq. 8) below.

$$B = A \cdot (2 - 2\cos\phi)^{1/2} \quad \text{(eq. 8)}$$

As is clear from (eq. 8), by monitoring the values (magnitude) of the amplitude A and amplitude B of the respective signal waveforms, the value of the phase difference $\phi$ is obtained. A signal (which may be of an arbitrary format, e.g., analog or digital) representing the value of the phase difference $\phi$ calculated in the above manner is sent to the offset correction amount calculation circuit 102 in FIG. 5, and a correction of the offset amount is performed. Specifically, in a manner similar to the operation which has been described with respect to the optical pickup device of Embodiment 1, the off-tracking amount correction calculation circuit 102 calculates a corrected off-track amount according to (eq. 4), and sends a signal (which may be of an arbitrary format, e.g., analog or digital) representing this off-tracking amount to the objective lens driving circuit 103. Based on this signal, the objective lens driving circuit 103 drives the objective lens driving device 104, moves the objective lens 205 along a disk radial direction, and corrects the off-tracking.

Thus, in accordance with the structure of the present embodiment, if there occurs an off-tracking that is ascribable to a phase difference $\phi$ between the MPP signal and the SPP signal, which would occur when the optical disk or the objective lens is tilted along a radial direction of the optical disk, the phase difference $\phi$ is detected, and a tracking control is performed which is corrected in such a manner as to cancel an off-tracking amount which is calculated by using the detected phase difference $\phi$. As a result, a stable tracking control is enabled, and the recording/reproduction performance of the optical pickup device can be improved.

The calculations of the MPP signal and the SPP signal performed in order to calculate the aforementioned phase difference $\phi$ can be easily performed by using calculation circuits comprised in an ordinary optical pickup device (calculation circuits for the processing of signals from an optical disk, servo control, and the like). Thus, without having to newly provide a phase detection circuit for the signal waveforms, the above can be realized with a simple circuit structure, and a stable tracking control can be attained at a low cost.

The angle of a tilt of an optical disk along a radial direction as shown in FIG. 8(b) changes in accordance with the positioning relationship between the optical disk and the optical pickup. Moreover, the tilt angle may rapidly fluctuate in a periodic manner while the optical disk is rotated by a motor. According to the present invention, in response to such dynamic fluctuations of the tilt angle, the offset to be applied to tracking control can be rapidly changed, whereby off-tracking can be reduced in a dynamic and adaptive manner. The reason why such dynamic compensation is possible is that the optical disk apparatus of the present invention compensates for phase shifts in signal waveforms through calculations.

Note that, in the case where the changes in phase difference $\phi$ as detected in the present invention are periodic, once the period is ascertained, then there is no need to always perform the operation of measuring the phase difference $\phi$ in real time. The periodically-changing magnitude may be predicted to compensate for off-tracking. By doing so, it will be possible to reduce the calculation amount.

Furthermore, although the calculation processes which are necessary for off-tracking compensation are performed inside the optical pickup device in the above embodiments, a part or whole of such calculations may be performed in any section in the optical disk apparatus other than the optical pickup device (e.g., a calculation section in an IC chip such as a servo processor). Such a servo processor is provided in, for example, the servo system 906 shown in FIG. 9.

In accordance with the optical disk apparatus of the present invention having the above structure, during data recording/reproduction operations, a main beam and a pair of sub beams are converged onto an optical disk, and based on the main beam and the sub beams reflected from the optical disk, a step of determining a main push-pull signal MPP, a sub push-pull signal SPP, and a differential push-pull signal DPP is executed. Then, a step of detecting a phase difference between the main push-pull signal MPP and the differential push-pull signal DPP is executed. Furthermore, based on this phase difference, an offset is applied in the tracking control of the main beam with respect to the optical disk, thus compensating for any off-tracking caused by a phase shift of the differential push-pull signal DPP.

INDUSTRIAL APPLICABILITY

According to the present invention, even in the case where an optical disk or an objective lens tilts along a radial direction of an optical disk, any off-tracking occurring due to a phase difference between an MPP signal and an SPP signal can be corrected, thus enabling a stable tracking control. As a result, the recording/reproduction performance of an optical pickup device can be improved.

The invention claimed is:

1. An optical disk apparatus comprising:
  a motor for rotating an optical disk;
  a light source;
  diffraction means for diffracting a portion of light emitted from the light source to form a main beam of $0^{th}$ order light and a pair of sub beams composed of $+1^{st}$ order light and $-1^{st}$ order light which are formed on both sides of the $0^{th}$ order light;
  an objective lens for converging the main beam onto a recording track of the optical disk and the pair of sub beams onto two tracks that are positioned at both sides of the recording track of the optical disk;
  light receiving means for receiving the main beam and the sub beams reflected from the optical disk, and outputting electrical signals through photoelectric conversion;
  a calculation section for, based on the electrical signals output from the light receiving means, providing a main push-pull signal MPP, a sub push-pull signal SPP, and a differential signal between the main push-pull signal MPP and the sub push-pull signal SPP; and
  phase difference detection means for detecting a phase difference between the main push-pull signal MPP and the sub push-pull signal SPP,
  wherein, in accordance with an output from the phase difference detection means, an offset is applied in a tracking control of the main beam with respect to the optical disk to compensate for an off-tracking caused by a phase shift of the differential signal, and
  comprising:
  signal amplitude calculation means for adjusting amplitudes of the main push-pull signal MPP and/or the sub push-pull signal SPP so that the amplitude of the main push-pull signal MPP and the amplitude of the sub push-pull signal SPP become equal;
  signal summation means for calculating a sum of the main push-pull signal MPP and the sub push-pull signal SPP which are output from the signal amplitude calculation means; and
  phase difference calculation means for, based on an output from the signal summation means, calculating a phase difference between the main push-pull signal MPP and the sub push-pull signal SPP.

2. The optical disk apparatus of claim 1, wherein the differential signal is a differential push-pull signal DPP.

3. The optical disk apparatus of claim 2, wherein the light receiving means comprises:
  a main-beam photodetector having four split photoelectric conversion sections for receiving the main beam reflected from the optical disk;
  a first sub-beam photodetector having two split photoelectric conversion sections for receiving one of the pair of sub beams; and
  a second sub-beam photodetector having two split photoelectric conversion sections for receiving the other of the pair of sub beams, and
  the calculation section further comprises:
  first calculation means for determining the main push-pull signal MPP=(A+D)−(B+C), based on signals A, B, C, and D obtained respectively from the four split photoelectric conversion sections of the main-beam photodetector;
  second calculation means for determining the sub push-pull signal SPP=(F−E)+(H−G), based on signals E and F obtained respectively from the two split photoelectric conversion sections of the first sub-beam photodetector and on signals G and H obtained respectively from the two split photoelectric conversion sections of the second sub-beam photodetector; and
  third calculation means for determining the differential push-pull signal DPP=MPP−α×SPP (where α is a constant), based on outputs from the first calculation means and the second calculation means.

* * * * *